Feb. 27, 1945. J. G. DUNN 2,370,151
QUICK RELEASING TRICING BLOCK
Filed May 19, 1939 5 Sheets-Sheet 5
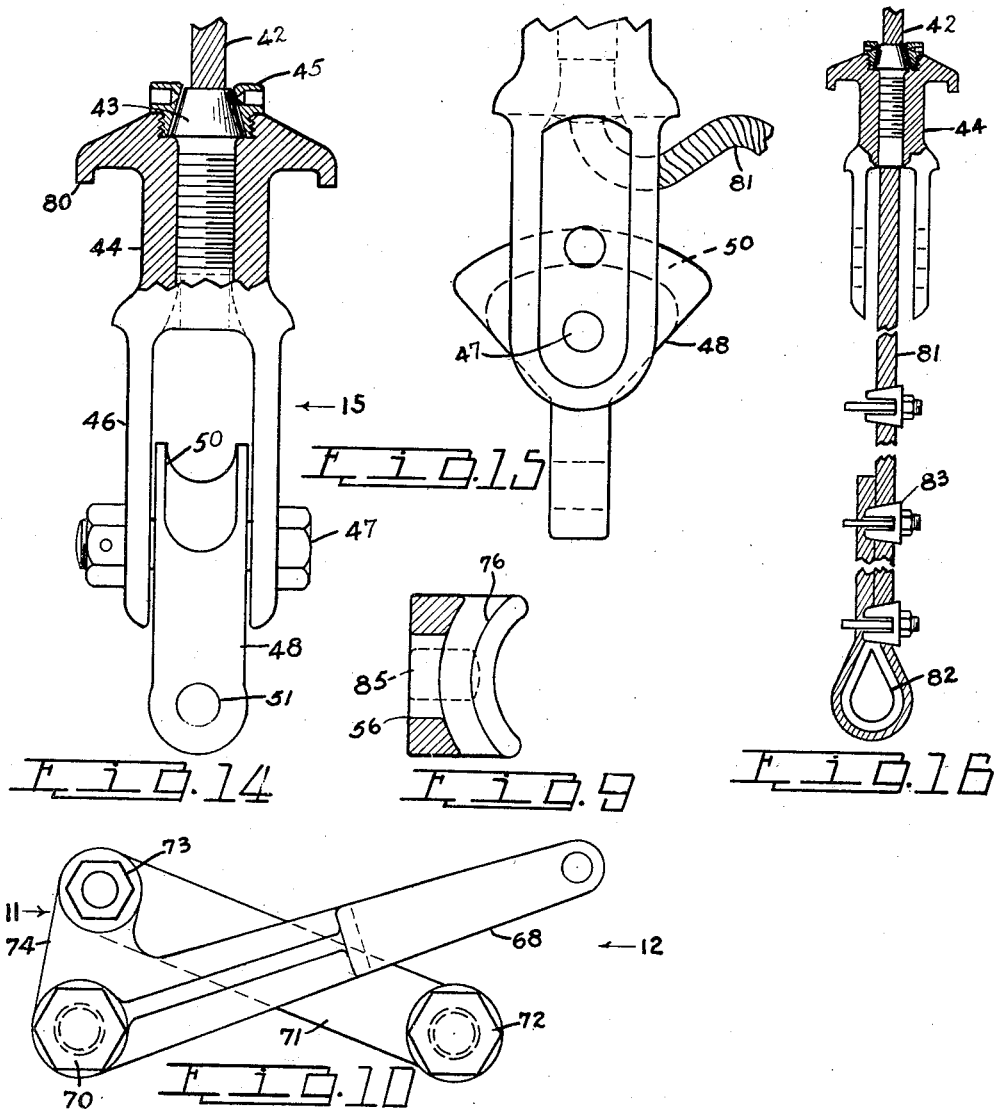

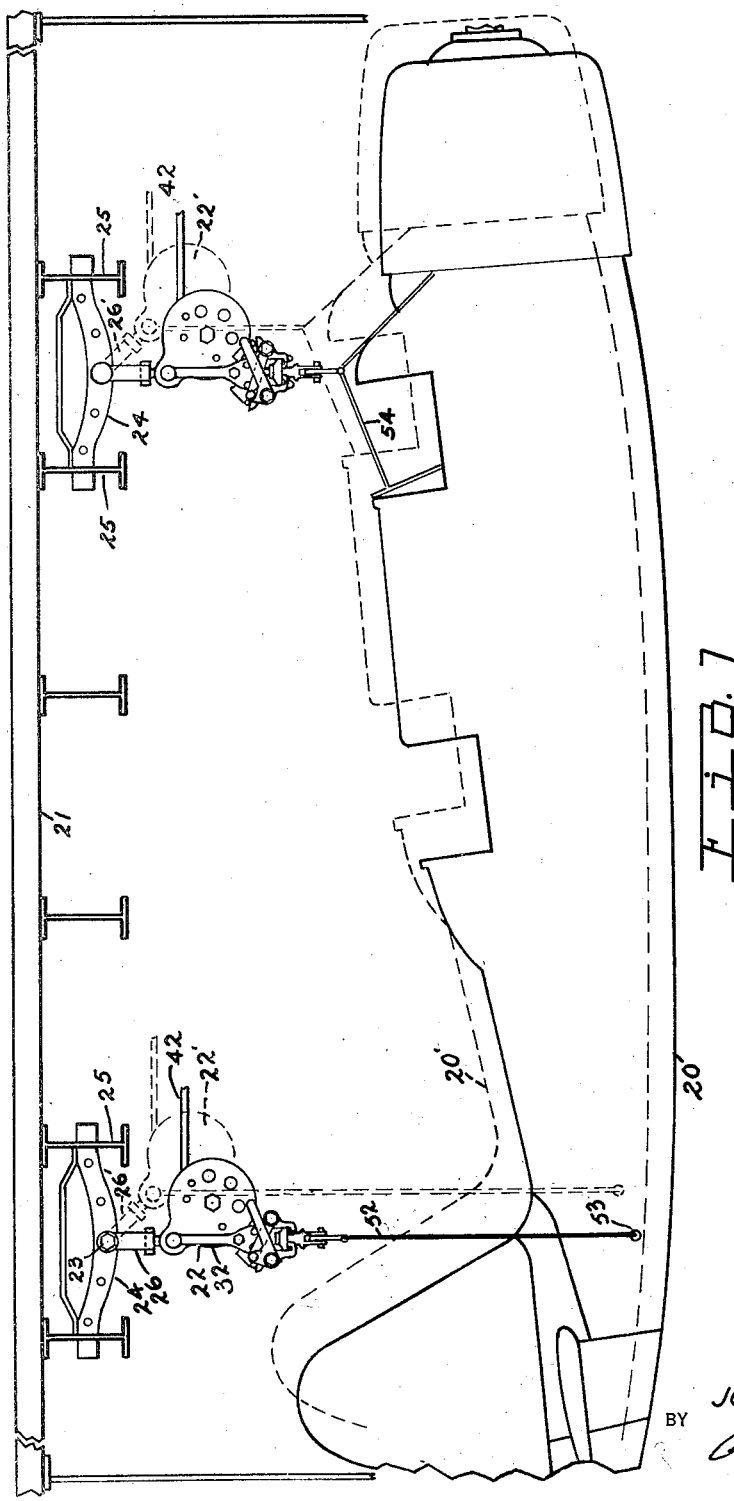

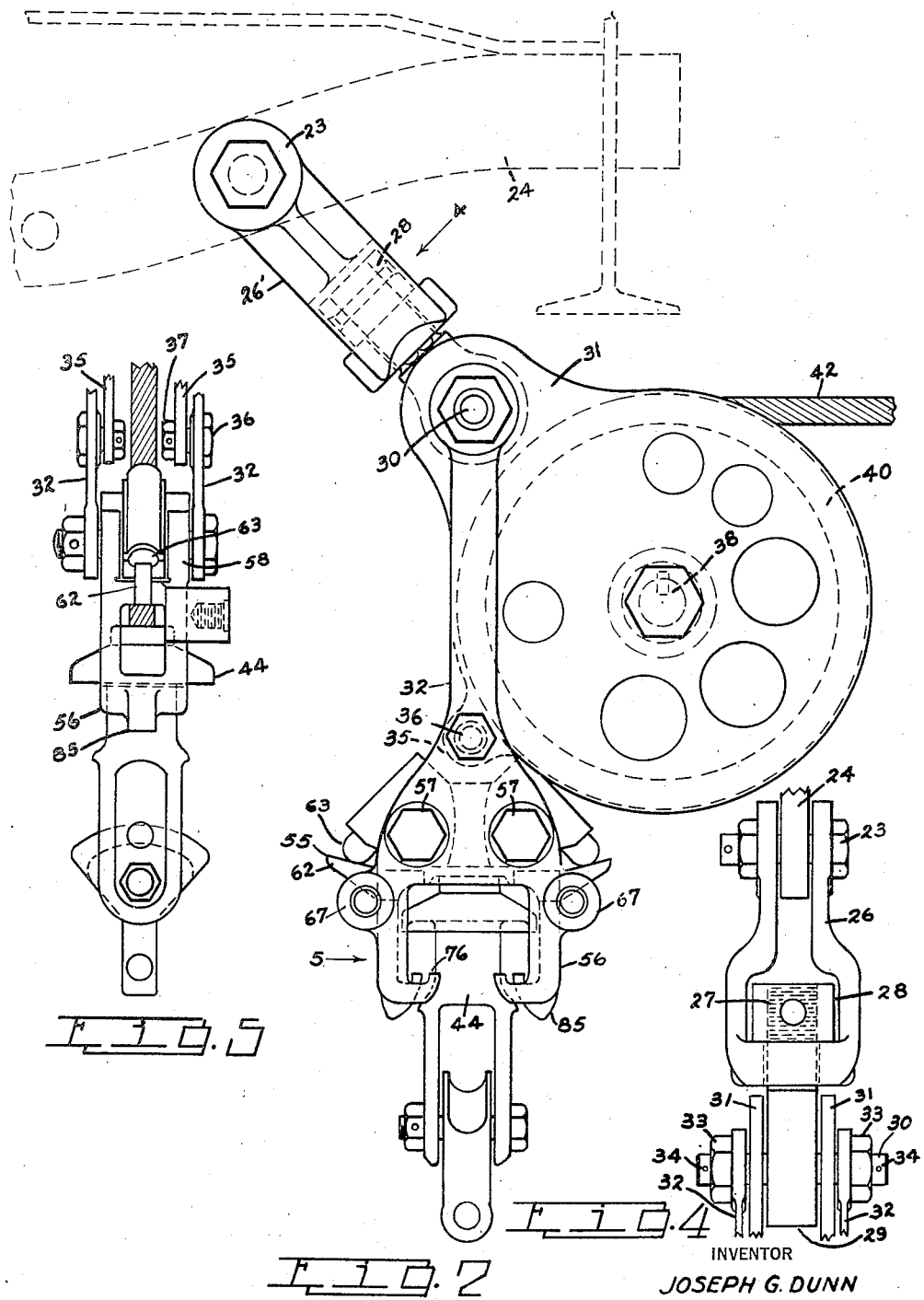

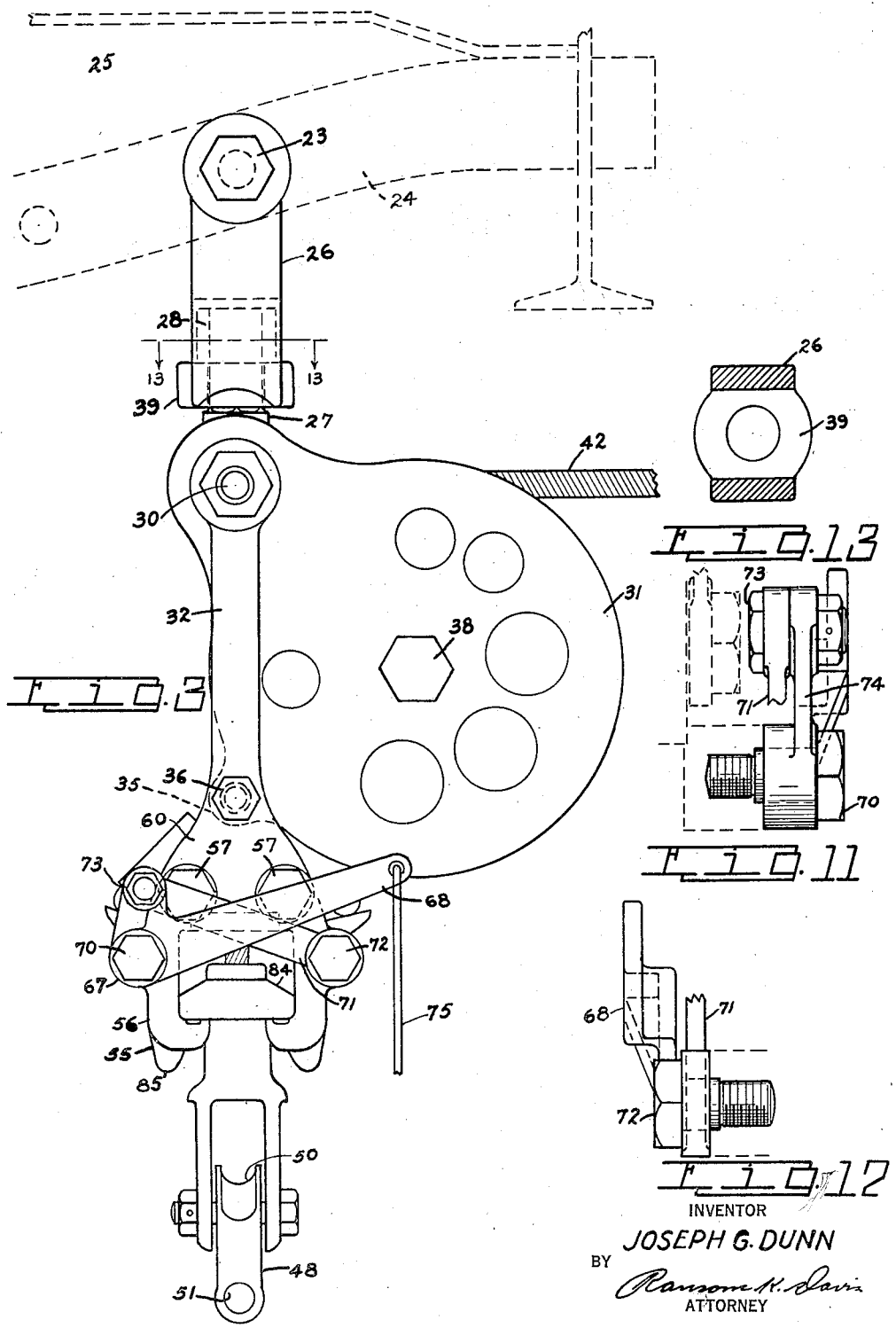

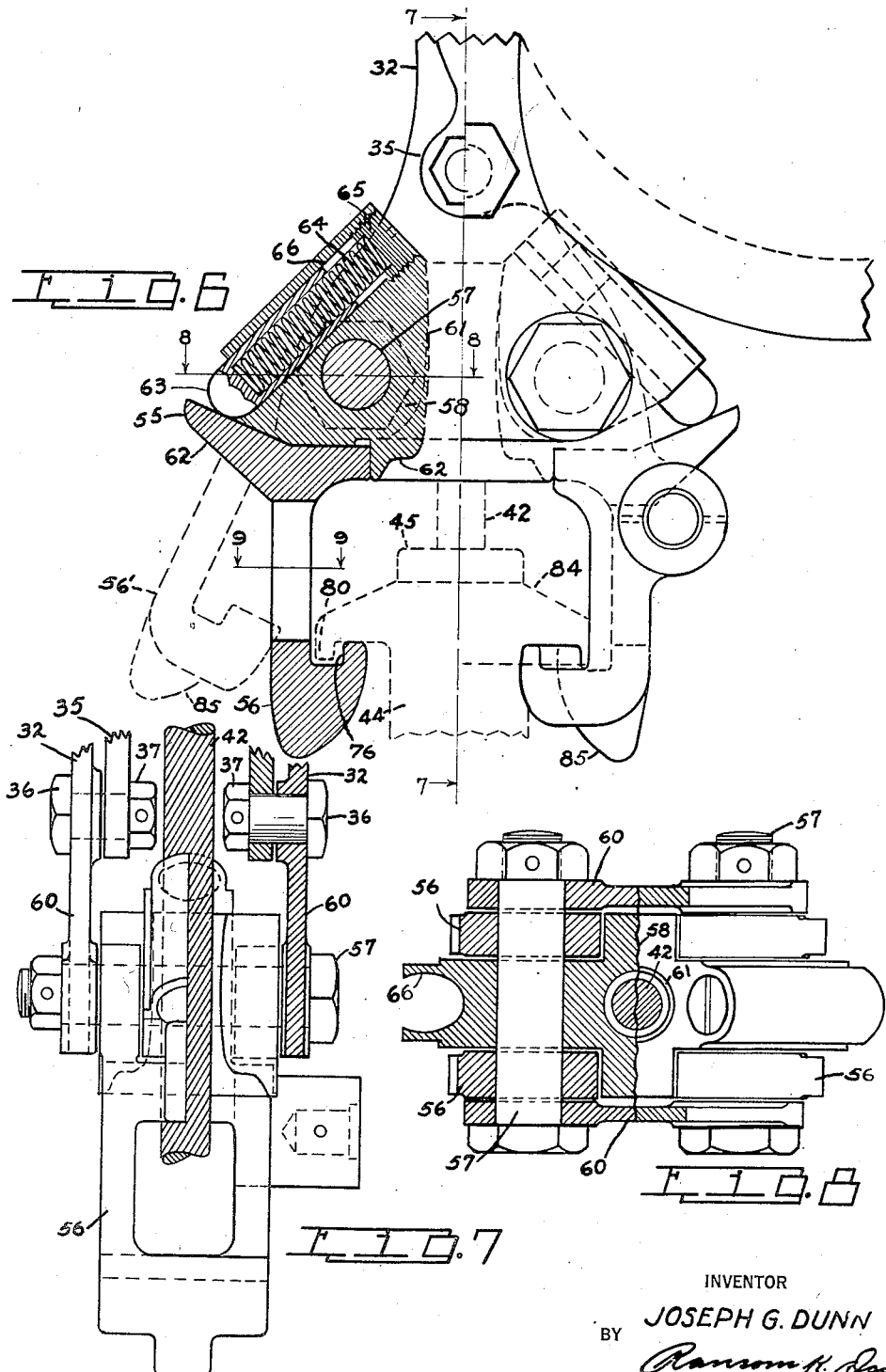

Patented Feb. 27, 1945

2,370,151

UNITED STATES PATENT OFFICE 2,370,151

QUICK RELEASING TRICING BLOCK

Joseph G. Dunn, Arlington, Va.

Application May 19, 1939, Serial No. 274,597

5 Claims. (Cl. 214—95)

(Granted under the act of March 3, 1883, as amended April 30, 1928; 370 O. G. 757)

This invention relates to quick releasing tricing blocks, especially intended for facilitating the handling of aircraft or other objects upon airplane carriers, ships, hangars, or other stowage places.

A further object of this invention is to provide an improved quick releasing tricing block which includes catch means for holding the load in a raised, suspended position, free from the hoisting cable, and at the same time includes means for quickly releasing the load and allowing it to be lowered by the hoisting cable.

In order to stow a maximum number of airplanes on board an airplane carrier it is necessary and desirable to hoist and secure some of the planes against the overhead, leaving the space therebelow free for other uses or additional stowage. The planes stowed against the overhead are usually raised by block and tackle, and then after so raised they must be fastened securely against swaying to prevent damage. When the customary block and tackle is used the weight of the airplane or load remains on the hoisting line while the airplane is being secured and after it is secured. Due to the length of the hoisting line there is apt to be considerable stretch in the line and it is difficult to secure the airplane firmly in stowed position. It is customary for an operator to lash another line around the hoisting block so as to hold the airplane as firmly as possible, which means that an operator must be raised with the airplane in order to be in position to lash the block. With this invention the conventional block and tackle is eliminated in favor of a tricing block which automatically relieves the hoisting line of any load as soon as the airplane is raised to the overhead and at the same time has a releasing means enabling the load to be transferred back to the hoisting line and lowered without the presence of an operator any nearer than the floor above which the airplane is being stowed.

With the foregoing and other objects in view, the invention consists in the construction, combination and arrangement of parts hereinafter described and illustrated in the drawings, in which, Fig. 1 is an elevational view of an airplane stowed against an overhead by means of the tricing blocks of this invention;

Fig. 2 is an elevational view of the tricing block with the catch in full up position;

Fig. 3 is a view of the tricing block, including the releasing lever, with the catch in extreme down position;

Fig. 4 is a fragmentary detail view of the swivel link looking in the direction of the arrow 4 in Fig. 2;

Fig. 5 is a detail view of the catch in the direction of the arrow 5 of Fig. 2;

Fig. 6 is a partly sectional and partly elevational side view of the latch;

Fig. 7 is a partly end view and partly sectional view on line 7—7 of Fig. 6;

Fig. 8 is a partly top and partly sectional view on line 8—8 of Fig. 6;

Fig. 9 is a partly sectional view of the latch jaw on line 9—9 of Fig. 6;

Fig. 10 is an elevational view of the latch releasing mechanism;

Fig. 11 is an end view at arrow 11 of Fig. 10;

Fig. 12 is an end view at arrow 12 of Fig. 10;

Fig. 13 is a sectional view on line 13—13 of Fig. 3;

Fig. 14 is a partly sectional and partly elevational view of the catch;

Fig. 15 is a detail view at arrow 15 of Fig. 14; and

Fig. 16 is an elevational view of a modified suspending means depending from the catch.

There is shown at 20 an airplane stowed near an overhead 21 through the use of the tricing block 22 of this invention. The tricing block 22 is suspended on a pivot bolt 23 from a header 24 which is somewhat bowed, as shown, and supported in lightening holes in the H-beams 25 of the overhead 21. Bolt 23 pivotally supports the U-shaped swivel link 26 which has an eye bolt 27 secured therein through an aperture in its bight 39 by a nut 28. The eye 29 of the eye bolt 27 supports a pin 30 on which is supported sheave cheeks 31 and side links 32, the pin 30 being held in position by nuts 33 and lock pins 34. Knobs 35 extending from sheave cheeks 31 are secured by bolts 36 and nuts 37, thereby holding the sheave cheeks 31 rigid with respect to the side links 32. A sheave axle 38 supports a grooved sheave wheel 40 between the sheave cheeks 31, the hoisting rope 42 being reeved over the sheave wheel 40 and between the side links 32, where it terminates in a swage fitting 43 threaded into the catch 44 and secured therein by a nut 45. The catch 44, it will be observed, is shaped somewhat like an umbrella with a bifurcated handle 46, within which is pivotally mounted by means of the bolt 47 a sling block 48 somewhat Y-shaped in outline with a sling receiving groove 50 in the head thereof and an eye 51 in the leg thereof.

A sling line 52 secured to the aircraft 20 by means of a hoisting bar 53 may be secured to the sling block 48 over the groove 50 or alternatively through the eye 51. The forward part of the aircraft 20 may be secured to a similar tricing block 22 by means of the tackle line 54 on the aircraft 20 being secured to its sling block 48.

The latch 55 for receiving and securing the catch 44 includes a pair of latch jaws 56 pivoted on bolts 57 which pass through the latch base 58. Also secured to the latch base 58 by means of the bolts 57 are the side links 32, which are enlarged, as at 60, to permit proper spacing of the bolts 57. The latch base 58 is provided with a vertical aperture 61 permitting the hoisting rope 42 to pass therethrough and is provided with a seat 62 against which the nut 45 of catch 44 may abut when the catch member is in full up position.

Each jaw 56 is provided with an angular finger 62 cooperating with a spring pressed plunger 63 having a coil spring 64 anchored against the threaded plug 65 and located in a channel 66 formed in the latch base 58. This plunger 63 presses against the outstanding fingers 62 of the jaws 56 and urges them to the latching position shown in full lines in Fig. 6, but permitting them to pivot to the dash line position 56' when the jaws 56 are urged apart, either by the catch 44 passing upwardly therethrough or by the release mechanism shown in Figs. 10, 11 and 12.

Each of the jaw members 56 is provided with an apertured knob 67. A bell crank releasing lever 68 is journaled on a bolt 70 passing through the apertured knob 67 of one jaw 56, while a releasing link 71 is similarly journaled on a bolt 72 through the apertured knob of the other jaw. The releasing link 71 is pivoted on a floating pin 73 to the bell crank arm 74 of the releasing lever 68, the end of releasing lever 68 having a pull cable 75 mounted thereon. Pulling the cable 75 downwardly causes the releasing lever 68 to move one of the jaw members 56 to the position 56' against the spring plunger 63, and through its bell crank arm and floating pivot 73, releasing link 71 simultaneously moves the other jaw a similar distance. Each of the jaws 56 is provided with a lip 76 which cooperates with a depending tongue 80 of the catch 44 for positively holding the jaws in down position when the weight of the catch member is thereon. Before operating the pull cable 75 the hoist cable 42 must be operated to move the catch member 44 to the full up position shown in Fig. 2.

As an alternative to the sling block 48 the hoisting rope 42 instead of ending in the fitting 43 may extend therethrough as at 81 and be folded back about a thimble 82 and held in folded back position by a plurality of clips 83, preferably five or more being used. In this form the sling block 48 may be omitted, as shown in Fig. 16, by merely removing the pivot pin 47, whereupon the thimble 82 serves to receive the sling line supporting load.

In operation, the aircraft 20 to be stowed near the overhead 21 has the customary tackle line 54 secured thereto adjacent its fore part, while aft a hoisting bar 53 is inserted through the aft aperture customarily provided therefor, and has a sling line 52 secured thereto. The sling line 52 and tackle line 54 are each attached to the sling block 48 in the conventional manner, the slings 48 being secured to the bifurcations 46 of the catch 44 by the bolts 47, as already described. The hoisting lines 42 of each of the tricing blocks 22 are then operated more or less simultaneously so as to raise the aircraft 20 on a more or less even keel. Each hoist line 42 as it passes around its sheave wheel 40 causes its tricing block 22 to pivot about the supporting pin 23 in the header 24 to the positions 22', the swivel links 26 moving to the positions 26', while the side links 32 move to the vertical position shown in Fig. 2. The hoist lines 42 are pulled by a winch or other suitable source of power until the aircraft is raised and the catch member 44 reaches the full up position shown in Fig. 2, against the seat 45. As the catch 44 just approaches this position, the sloping top 84 of the catch abuts against tapered depending bosses 85 on the jaws 56, pressing the jaws 56 to the position 56' against their spring plungers 63, and thereby permitting the catch 44 to pass to the full up position shown in Fig. 2.

Immediately that the edges of the depending bosses 80 of the catch 44 have passed above the inner edges of the jaws 56, the jaws 56 snap back to the latching position so that when the tension on the hoist lines 42 is slackened off the catch 44 returns to the extreme down position relative to the jaws 56, with the tongues 80 behind the lips 76 of the jaws 56. Simultaneously, the tricing block 22 moves from the position shown in Fig. 2 to that shown in Fig. 3 about the supporting pin 23, and the whole mechanism of the tricing block and the aircraft move from the positions shown at 22' and 20' in Fig. 1 to the position shown at 22 and 20. In this position the full weight of the aircraft is carried solely by the tricing blocks and no weight at all is held on the hoisting lines 42. As thus supported additional guy ropes and lashings may be placed about the aircraft 20 to hold it immovably in stowed position in the customary manner. When it is desired to remove the aircraft 20 from the stowed position, the lashings and guy ropes are removed and the tension is applied to the hoist lines 42 to move the catch 44 to the full up position shown in Fig. 2.

While in this full up position, the lever cable 75 is operated to move the jaws 56 to the open position at 56', and is held while the hoist lines 42 is slackened off to lower the aircraft away, the lever cable 75 being released after the catch member 44 has emerged from between the latch jaws 56.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A tricing block for raising and supporting a load in raised position, comprising a hoist line, a load supporting catch member secured to said hoist line, a releasable latch member for receiving and holding said load supporting catch member in raised position, said releasable latch member including a pair of pivotally supported jaw members, yieldable means holding said jaw members in catch supporting position, and remote control means for holding said jaw members in non-supporting position.

2. A tricing block for releasably supporting a load, comprising a load supporting catch member, a releasable catch supporting latch member, hoisting means for raising and lowering said catch member to and from said latch member, said hoisting means comprising a sheave, a hoisting cable reeved over said sheave and through said latch member and secured to said catch member, and universal pivoted means for supporting said sheave and catch member, said universal supporting means comprising a swivel link, pivotal means supporting said swivel link, side link members secured to said swivel link, said sheave and said latch member being secured to said side link members.

3. Means for raising and releasably supporting a load, comprising a pivotally supported swivel link, a swivel bolt depending from said swivel link, a pivoting pin secured to said swivel bolt, a pair of side link members supported on said pivot pin, a sheave comprising a pair of sheave cheeks, a sheave wheel, a sheave journal extending through said sheave cheeks rotatably supporting said sheave wheel, said sheave cheeks being fixed to said side links, a latch member secured to said side links, said latch member comprising a latch base, a pair of jaw members pivotally secured to said latch base, yieldable means urging said jaw members to latching position, remotely controllable releasing means for moving said jaw members to unlatching position, said latch base having an aperture therethrough, a hoisting cable reeved through said latch base aperture and over said sheave wheel and between said jaw members, and a load supporting catch member secured to said hoisting cable.

4. Means for raising and releasably supporting a load, comprising a pivotally supported swivel link, a swivel bolt depending from said swivel link, a pivoting pin secured to said swivel bolt, a pair of said link members supported on said pivot pin, a sheave comprising a pair of sheave cheeks, a sheave wheel, a sheave journal extending through said sheave cheeks rotatably supporting said sheave wheel, said sheave cheeks being fixed to said side links, a latch member secured to said side links, said latch member comprising a latch base, a pair of jaw members pivotally secured to said latch base, yieldable means urging said jaw members to latching position, remotely controllable releasing means for moving said jaw members to unlatching position, said latch base having an aperture therethrough, a hoisting cable reeved through said latch base aperture and over said sheave wheel and between said jaw members, a load supporting catch member secured to said hoisting cable, upstanding lips on said jaw members and depending tongues on said catch member cooperating with said lips to hold said catch member on said jaw members.

5. Means for raising and releasably supporting a load, comprising a pivotally supported swivel link, a swivel bolt depending from said swivel link, a pivoting pin secured to said swivel bolt, a pair of side link members supported on said pivot pin, a sheave comprising a pair of sheave cheeks, a sheave wheel, a sheave journal extending through said sheave cheeks rotatably supporting said sheave wheel, said sheave cheeks being fixed to said side links, a latch member secured to said side links, said latch member comprising a latch base, a pair of jaw members pivotally secured to said latch base, yieldable means urging said jaw members to latching position, remotely controllable releasing means for moving said jaw members to unlatching position, said latch base having an aperture therethrough, a hoisting cable reeved through said latch base aperture and over said sheave wheel and between said jaw members, a load supporting catch member secured to said hoisting cable, upstanding lips on said jaw members and depending tongues on said catch member cooperating with said lips to hold said catch member on said jaw members, a sloping top on said catch member, and cooperating angular surfaces on the bottom of said jaw members whereby said catch member will move said jaw members apart as said catch member is hoisted toward latching position.

JOSEPH G. DUNN.